March 23, 1971  F. J. ADAMS ET AL  3,572,157
PIN AND SOCKET PINION BEARING FOR RACK AND PINION ASSEMBLY
Filed July 8, 1969
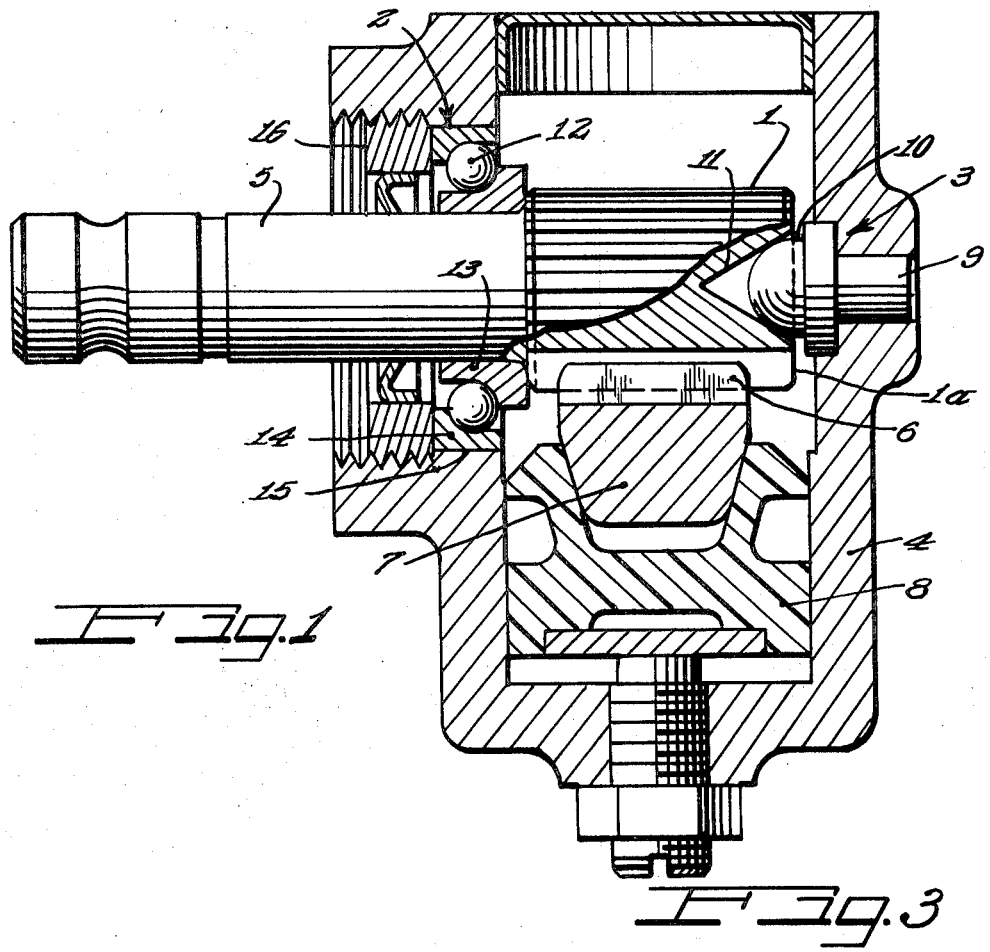
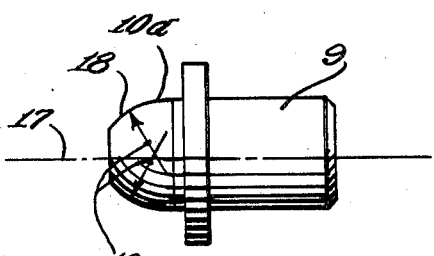
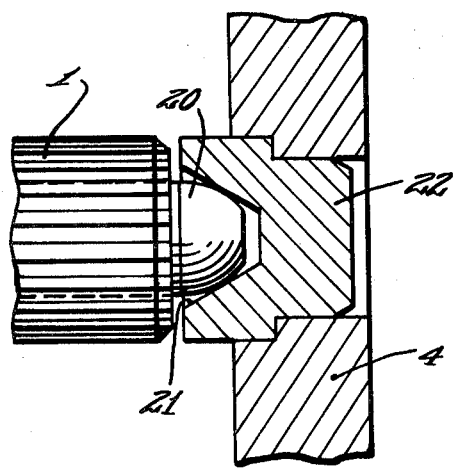
INVENTORS
Frederick John Adams
Ronald Stanley Goldsmith
BY
ATTORNEYS 000# United States Patent Office 3,572,157
Patented Mar. 23, 1971

3,572,157
PIN AND SOCKET PINION BEARING FOR RACK AND PINION ASSEMBLY
Frederick J. Adams, Campton, near Shefford, and Ronald S. Goldsmith, Hitchin, England, assignors to Cam Gears Limited, Hitchin, England
Filed July 8, 1969, Ser. No. 839,882
Claims priority, application Great Britain, Aug. 30, 1968, 41,435/68
Int. Cl. B62d 1/20
U.S. Cl. 74—498         8 Claims

ABSTRACT OF THE DISCLOSURE

An inexpensive pinion mounting for rack and pinion assemblies useful in automotive steering gear having cooperating socket and pin or spigot parts providing radial and thrust bearing surfaces supporting a free end of the pinion and coacting with an adjustable anti-friction radial and thrust bearing to rotatably mount the pinion and hold it against axial shifting in a housing for the assembly.

BACKGROUND OF THE INVENTION

Field of the invention

This invention pertains to the art of bearing mountings, and particularly to the mounting of a pinion of a rack and pinion assembly in a housing for the assembly.

Description of the prior art

Rack and pinion assemblies for automotive steering gear have heretofore required relatively expensive bearing mounts for the pinion. For example, in the Frederick John Adams U.S. Pat. 3,421,387 granted Jan. 14, 1969, two sets of anti-friction bearing units are required to mount the pinion in its housing. Each bearing unit has an inner race ring surrounding a shaft extension on the pinion and an outer race ring seated in the housing.

SUMMARY OF THE INVENTION

The present invention now replaces one of the expensive anti-friction bearing units of the prior art with an inexpensive pin or spigot and socket mounting which provides both radial and axial support for the free end of the pinion in its housing. A bearing head which may be provided either on the end of the pinion or on a member carried by the housing seats in a recess either provided by the pinion or by the housing. The head and recess have co-acting bearing surfaces affording both radial and axial support for the free end of the pinion.

The remaining anti-fraction bearing unit in the assembly surrounds the pinion shaft and is axially adjustable in the housing to preload the pin and socket bearing surfaces, which converge in an axial direction so that axial adjustment of the pinion in the housing will control the tightness of the bearing fit.

The rack and pinion assemblies of this invention thus include a pinion supported in its housing in a pair of axially spaced bearings located at each end of the pinion teeth, with one bearing being an axially adjustable anti-friction bearing unit on the shaft or shank of the pinion which projects from the housing, and the other bearing being a spigot and socket bearing at the free end of the pinion in the housing.

Thus according to the present invention there is provided a rack and pinion assemby of the kind specified in which the pinion is partly borne at a free end thereof in a bearing which comprises cooperating socket and spigot parts which are co-axial with the pinion and of which one part is fixedly secured to the pinion housing and the other part is fixedly secured for axial rotation with the pinion, and during axial rotation of the pinion member the part provided on the pinion member axially rotates therewith relative to the other part.

The spigot part is conveniently fixedly secured to the wall of the housing to project into a socket provided in the end of the pinion. The pinion may be further borne in a roller bearing which is axially spaced from the socket and spigot parts bearing and conveniently comprises a ball race as is well known in the art. The ball race comprises a plurality of roller members which move around an endless track provided between an inner and outer race, the inner race being secured for rotation with the pinion and the outer race being mounted in the pinion housing. Preferably the outer race is axially adjustable to provide means whereby a required degree of preload can be applied to rotation of the pinion.

The spigot part can be of hemispherical, conical or other suitable shape to permit relative rotation between itself and the socket part.

It is then an object of this invention to reduce the cost of rack and pinion assemblies for automotive steering gear and the like without affecting the efficiency and safety thereof.

A further object of this invention is to provide an inexpensive pinion mounting for rack and pinion steering gear assemblies replacing at least one anti-friction bearing unit in such assemblies.

Another object of this invention is to provide a cooperating socket and spigot arrangement forming a radial and thrust bearing for the free end of a pinion in a rack pinion assembly.

A further object of this invention is to provide a pinion mounting for the free end of a pinion in a housing composed of co-axially aligned socket and spigot parts respectively provided by the housing and pinion.

Other objects, features and advantages fo the invention will be readily apparent from the following description of certain preferred embodiments of the invention taken in conjunction will the accompanying drawing, although variations and modifications may be effected without departing from the spirit and scope of the novel concepts of the disclosure.

BRIEF DESCRIPTION OF THE DRAWINGS

FIG. 1 is a cross-sectional view normal to the longitudinal axis of the rack bar of a rack and pinion assembly constructed in accordance with the present invention in which the spigot part is fixedly secured to the pinion housing;

FIG. 2 is an elevational view of a modified spigot part which can be substituted for the part shown in FIG. 1;

FIG. 3 is a fragmentary enlarged elevational view, with parts in cross-section, of a modified bearing for the free end of the pinion wherein the spigot part is provided on the pinion.

DESCRIPTION OF THE PREFERRED EMBODIMENTS

Referring firely to FIG. 1 which illustrates a rack and pinion assembly of the kind specified, a pinion 1 is rotatably mounted on a pair of axially spaced bearings shown generally at 2 and 3 in a pinion housing 4. The pinion 1 can be rotatably driven by a shaft 5 and engages with a rack 6 of a rack bar 7 so that rotation of the pinion effects in movement of the rack bar 7 in a longitudinal direction through the pinion housing 4.

In the rack and pinion assembly illustrated the rack bar 7 is supported on the side thereof remote from the rack 6 in a carrier 8 which is conveniently made in a semi-rigid plastics material and is located between the rack bar and the pinion housing 4. During its longitudinal movement the rack bar 7 slides through the carrier 8 and deforms the carrier 8 against the pinion housing 4 thus locating the rack bar against transverse movement while resiliently supporting the same; the provision of such a carrier 8 is the subject of the Frederick John Adams U.S. patent application Ser. No. 839,957 filed of even date herewith.

The bearing 3 comprises a peg 9 which is fixedly secured in the wall of the housing 4 so that a hemispherical head or spigot part 10 provided on the peg projects axially from the inner wall of the housing to be co-axial with the pinion 1. The pinion 1 is provided in its free end 1a with a conical socket 11 which is co-axial therewith. The pinion is mounted in the housing 4 so that the socket 11 co-operates with the hemispherical head 10 to provide a circular line of contact.

The bearing 2 is a roller bearing and comprises a plurality of balls 12 which are movable along an endless circular track formed between an inner race 13 which is fixedly secured to the shank 5 and an outer race 14 which is axially slidable in an aperture 15 provided in the wall of the housing 4. The outer race 14 is retained in operative engagement with the ball 12 by an annular plate 16 which is externally screw threaded and engages with an internal screw thread provided in the aperture 15.

In operation of the rack and pinion assembly, the pinion 1 is axially rotated by the shaft 5 during which the inner race 13 is rotatively borne through the balls 12 and the conical socket 11 rotates on the hemispherical head 10 and the rack bar 7 is moved longitudinally through the housing 4.

By screw adjustment of the nut 16 in the housing 4, the outer race 14 can be moved axially relative to the inner race 13 so that the degree of friction developed by the bearings 2 and 3 during rotation of the pinion can be adjusted to provide a required degree of preload for rotation of the pinion.

FIG. 2 illustrates a modified peg 9 having a head or spigot part 10a which is adapted to co-operate with a socket provided in the end of the pinion. The head 10a is symmetrical about the axis 17 and has a side surface 18 of convex shape which has a profile of curved form struck from radii denoted by the arrows 19 to provide a circular line of contact with the socket 11 as in FIG. 1.

In the modification illustrated in FIG. 3 the spigot part is carried by the pinion and projects from the free end thereof and the socket part is located in the wall of the housing 4. In FIG. 3 the spigot 20 is formed integral with the pinion 1 and can be provided with a hemispherical head similar to that shown at 10 (in FIG. 1) or with a head similar to that shown at 10a (in FIG. 2). The head co-operates with a socket 21 which is of frusto-conical form to provide a circular line of contact. The socket 21 is formed in an insert 22 which is fixedly secured in an aperture provided in the wall of the pinion housing 4.

We claim as our invention:
1. A rack and pinion assembly for automotive steering gear which comprises a housing, a pinion having a free end in said housing and a shaft opposite said free end projecting from the housing, a rack extending through said housing normal to the axis of the pinion, meshed teeth on the rack and pinion, an anti-friction radial and thrust bearing having an inner race fixed to said shaft and an outer race slidable in the housing, a nut threaded in the housing thrusting against the outer race in a direction towards said free end of the pinion, and a spigot and socket bearing means having co-acting radial and thrust bearing surfaces carried by the pinion, and housing supporting the free end of the pinion in the housing and co-operating with the anti-friction bearing to rotatably mount the pinion in the housing and to prevent axial shifting of the pinion relative to the housing.

2. The assembly of claim 1 wherein the spigot and socket bearing means is composed of a socket recess in the free end of the pinion and a pin carried by the housing having a head seated in said recess, and said recess and head having axially converging circumferential bearing surfaces in circular line contact.

3. The rack and pinion assembly of claim 1 wherein the spigot and socket bearing means includes a co-axial converging head on the free end of the pinion and an insert carried by the housing, with a converging recess receiving said head in circular line contact.

4. The rack and pinion assembly of claim 1 wherein the spigot is a peg seated in a bore in the housing and has a converging bearing head co-axial with the pinion projecting into the housing.

5. The assembly of claim 1 wherein the spigot is a hemispherical head projecting from the free end of the pinion in co-axial relation.

6. A pinion mounting for the pinion of a rack and pinion steering gear assembly including a housing receiving a rack bar therethrough and a pinion in meshed engagement with the rack bar having a shaft projecting from one end of the housing and a free end in the housing, said mounting including an anti-friction bearing on the shaft and a pin and socket bearing means supporting the free end of the shaft from the housing, said pin and socket bearing means having surfaces providing a circular line of contact therebetween and axially converging to maintain said contact, and a nut threaded in the housing engaging the anti-friction bearing for pre-loading the circular line of contact to maintain the parts in assembled bearing contact.

7. The bearing mounting of claim 6 wherein the socket has a concave bearing surface and the head has a non-conforming convex bearing surface to provide the line contact therebetween.

8. A rack and pinion assembly comprising a housing, a rack bar slidable through said housing, a pinion rotatably mounted in said housing having a shaft projecting from the housing and a free end in the housing, said rack bar and pinion having teeth in meshed engagement in the housing, a radial and thrust bearing on the shaft of the pinion slidably mounted in said housing, spigot and socket bearing means having coacting radial and thrust bearing surfaces carried by the pinion and housing supporting the free end of the pinion in the housing, and adjustable means carried by the housing acting against the radial and thrust bearing to axially load the spigot and socket bearing means for prevening axial and radial shifting of the pinion in the housing to hold the pinion in fully meshed engagement with the rack bar.

References Cited
UNITED STATES PATENTS 881,202 3/1908 Schofield _____ 308—159X
3,362,248 1/1968 Meyers _____ 74—500

FOREIGN PATENTS 613,432 12/1960 Italy _____ 74—498

MILTON KAUFMAN, Primary Examiner

U.S. Cl. X.R.
74—409, 422